(12) United States Patent
Diddee et al.

(10) Patent No.: US 7,668,918 B2
(45) Date of Patent: Feb. 23, 2010

(54) UTILIZING INSTANT MESSAGING TO EFFECTUATE STRUCTURED COMMUNICATION

(75) Inventors: Sudhir Diddee, Woodinville, WA (US); Dan M. Michaud, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/909,530

(22) Filed: Aug. 2, 2004

(65) Prior Publication Data

US 2006/0026256 A1 Feb. 2, 2006

(51) Int. Cl.
*G06F 15/16* (2006.01)
(52) U.S. Cl. .................. 709/206; 709/204; 709/205; 709/207
(58) Field of Classification Search ............ 709/206
See application file for complete search history.

(56) References Cited

U.S. PATENT DOCUMENTS

| | | | |
|---|---|---|---|
| 5,997,476 A | 12/1999 | Brown et al. ............... 600/300 |
| 6,138,145 A | 10/2000 | Kawanaka et al. ........... 709/204 |
| 6,912,564 B1 * | 6/2005 | Appelman et al. ........... 709/204 |
| 7,325,034 B2 * | 1/2008 | Douglis et al. .............. 709/205 |
| 2003/0093480 A1 * | 5/2003 | Lagarde et al. .............. 709/206 |
| 2004/0058697 A1 | 3/2004 | Inselberg | |
| 2005/0267975 A1 * | 12/2005 | Qureshi et al. .............. 709/229 |
| 2006/0021023 A1 | 1/2006 | Stewart et al. | |
| 2006/0026253 A1 * | 2/2006 | Kessen et al. ............... 709/207 |
| 2007/0162589 A1 * | 7/2007 | Riddle ........................ 709/223 |

* cited by examiner

*Primary Examiner*—Jeffrey Pwu
*Assistant Examiner*—Abdelnabi O Musa
(74) *Attorney, Agent, or Firm*—Westman, Champlin & Kelly, P.A.

(57) ABSTRACT

The present invention uses instant messaging to effectuate structured communication. A structured communication component is used in conjunction with an instant messaging component to allow an instant messaging user to quickly formulate a structured communication for transmission to one or more recipients. The recipients are presented with the structured communications such that they provide a structured response that is transmitted back to the sender. The responses from the various recipients can then be reviewed, such as in a desired report format, by the sender.

30 Claims, 9 Drawing Sheets

UTILIZING INSTANT MESSAGING TO EFFECTUATE STRUCTURED COMMUNICATION

BACKGROUND OF THE INVENTION

The present invention relates to structured communication and instant messaging. More specifically, the present invention relates to utilizing instant messaging to effectuate structured communication.

Instant messaging is a well-known and documented real time communication system. Typically, instant messaging allows users to subscribe to an instant messaging service which handles substantially instantaneous communication between subscribers. In order to communicate using instant messaging, a subscriber activates an instant messaging client component and can send a text message to another member who has an activated instant messaging component. If the recipient is not "online" (i.e., if their instant messaging component is not currently on or active) then instant messages intended for that recipient are queued by the instant messaging client or by the service provider for later transmission once the intended recipient becomes active. Some instant messaging systems also allow subscribers to send images, play audio files, launch web sites, or view video information, such as through a web camera device.

Instant messaging is currently very popular. Current estimates indicate that there are approximately 600 million active instant messaging accounts, worldwide. In the next three years, this is expected to grow to approximately 1.5 billion instant messaging accounts worldwide. Adoption of instant messaging services is expected to grow very quickly in both consumer and business markets. In addition, the number of instant messaging transmissions (i.e., instant messages) sent is increasing steadily. The number of instant messages is currently estimated to be approximately 585 million messages per day and is expected to grow to approximately 1.4 billion messages per day over the next three years.

Despite its popularity, instant messaging suffers from a number of disadvantages. These disadvantages stem primarily from the fact that communication using instant messaging is unstructured. In other words, most instant messaging functionality simply allows a user to enter free form text into a text box and send it to a recipient. Although this is an effective tool for communicating simple messages and dialog between two people, it becomes highly ineffective as the number of persons involved in the communication increases. Even with a relatively small group of people, the communication becomes so unstructured and random that it is almost reduced to a noise level. Therefore, instant messaging is not an effective tool for reaching consensus in a group, or driving convergence of discussions in a group setting.

Driving such consensus, or reaching agreements in a group of people in different locations, is typically done using other known forms of communication, for example, the telephone or electronic mail. For instance, assume that the leader of a team of employees wishes to obtain a consensus on a suitable location for a meeting. Instead of using instant messaging, primarily because of the above drawbacks, the team leader will typically either call each employee to find out that employee's preference for a meeting location, or send an electronic mail transmission to all employees asking them to respond with their requested meeting locations. In either case, the leader must then follow up with all the employees once responses are received.

These forms of communication can be cumbersome. Calling each employee allows the team leader to obtain the desired information, but can take a relatively long time, because the team leader must call each individual employee. While the team leader can broadcast an electronic mail transmission to a group quite quickly, that electronic mail transmission is responded to by the recipients many times over, generating a very long electronic mail thread that is hard to consolidate into a decipherable form. Thus, both of the conventional options have proven to take an undesirable amount of time and to be highly ineffective at quickly resolving questions.

There are also known technologies for conducting structured communications, such as surveys. However, these technologies typically offer web-based solutions whereby questions in the survey are painstakingly authored, as is branching logic for determining a next appropriate question based on a previous answer. Such systems are not well suited to quick generation of a structured communication for introducing structure into group conversation contexts.

SUMMARY OF THE INVENTION

The present invention uses instant messaging to effectuate structured communication. A structured communication component is used in conjunction with an instant messaging component to allow an instant messaging user to formulate a structured communication for transmission to one or more recipients. The recipients are presented with the structured communications such that they provide a structured response that is transmitted back to the sender of the message. The responses from the various recipients can then be reviewed, such as in a desired report format, by the sender.

DETAILED DESCRIPTION OF ILLUSTRATIVE EMBODIMENTS

The present invention deals with instant messaging. More specifically, the present invention deals with an integration of structured communication into an instant messaging environment. However, before describing the present invention in greater detail, one embodiment of a computer system on which the present invention can be used will be discussed.

Figure 1:
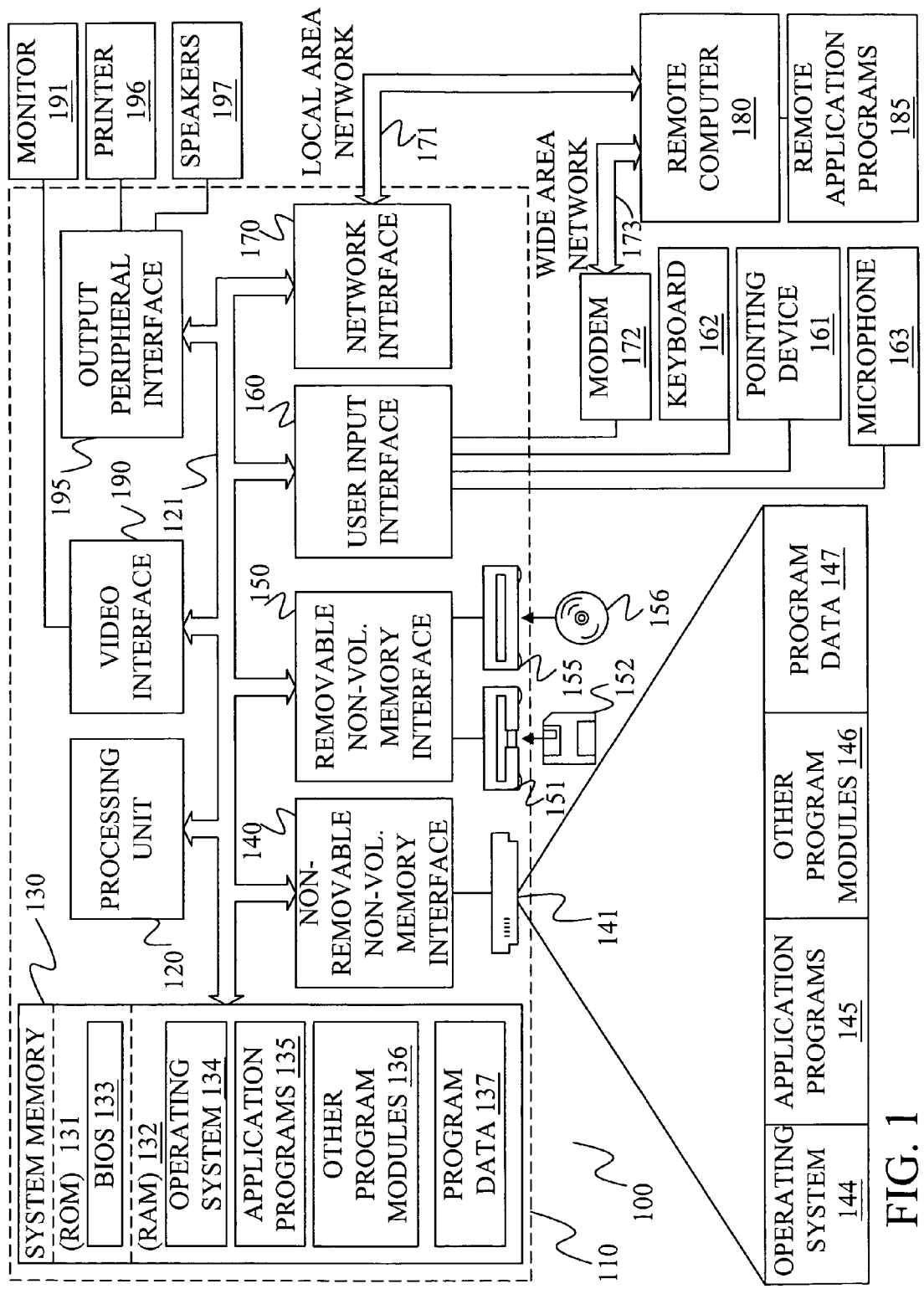
FIG. 1 is a block diagram showing one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
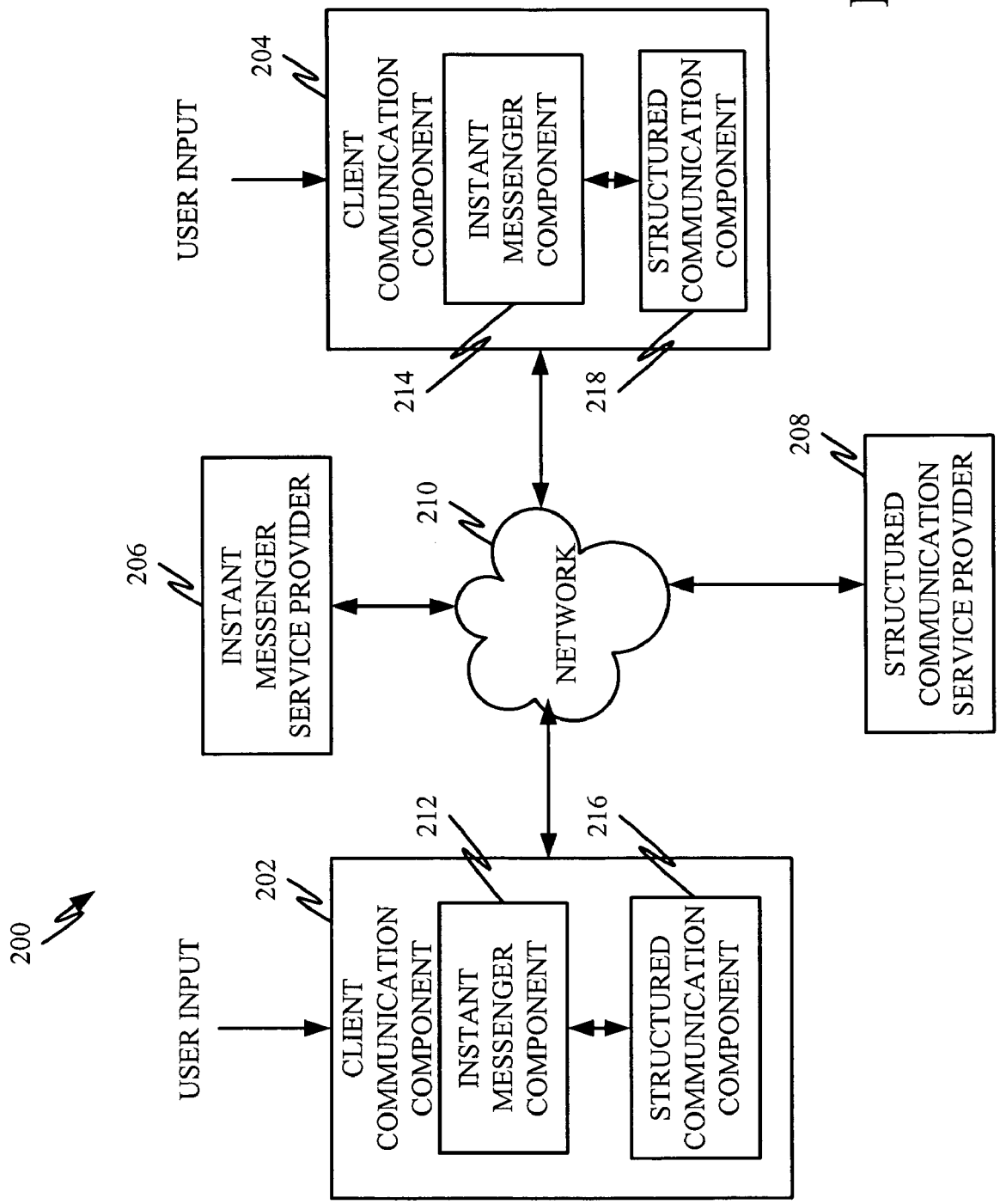
FIG. 2 is a more detailed block diagram of an illustrative environment in which the present invention can be used.

FIG. 2 shows a system 200 that includes two user communication components 202 and 204. System 200 also includes instant messenger service provider 206 and structured communication service provider 208. Components 202-208 are shown connected with one another through network 210. Network 210 is, in one illustrative embodiment, a global computer network, such as the Internet. However, network 210 can also be any other network, such as an intranet, or another network.

Each of the communication components 202 and 204 include an instant messenger component 212 and 214, respectively, and a structured communication component 216 and 218, respectively.

Communication components 202 and 204 are illustratively computing devices, such as the computer described with respect to FIG. 1 or any of the computing components described therein, or a mobile device, such as a cellular telephone, a personal organizer with networking capability or another computing device such as a laptop computer, a palmtop computer, a notebook computer, a computer installed in an automobile, a pager, etc.

In any case, the instant messenger components 212 and 214 are installed on components 202 and 204, respectively, and interact with instant messenger service provider 206 in a known way such that user's can provide user inputs to components 202 and 204 to engage in instant messaging with one another.

Structured communication components 216 and 218 are also illustratively installed on components 202 and 204 and can either be integral with components 212 and 214, or separate therefrom. Structured communication components allow users to access structured communications through instant messenger components 212 and 214, respectively. As used herein, the term structured communication refers to a communication to a recipient that allows the recipient to choose one of a plurality of pre-defined responses to the communication. For instance, a structured communication might be a question (or a series of questions) along with a list of responses that can be selected by the recipient to respond to the question (or series of questions). The structured communication may be formed so the list of responses can be selectable in any desired way, such as through a drop down menu, a check box, radio buttons, etc. Also, one of the selectable responses might include a text box so the recipient can enter textual comments as well.

In one embodiment, the generation, receipt and processing of the structured communications is all performed by structured communication client components 216 and 218 in conjunction with instant messaging components 212 and 214. This is described in greater detail below. Alternatively, some generation, handling or processing of the structured communication can be performed by communication service provider 208 which can be a server-based component. In that embodiment, structured communication service provider 208 is illustratively a service provider that interacts with structured communication components 216 and 218 to allow a user to quickly and efficiently construct a structured communication for use by recipients. The user can then transmit a link to that structured communication to another user using instant messenger component 212 or 214. In yet another embodiment, components 216 and 218 (or one component performing functions of both components 216 and 218) reside on service provider 208 or other server. The necessary information to perform in accordance with the present invention is simply passed between components 202 and 204 and service provider 208 (or other server), or a link to that information is passed. In any of these embodiments, the user can alternatively embed the structured communication into the instant message and transmit it to another user using the instant messenger components.

For the sake of the present description it will be assumed that components 216 and 218 reside on components 202 and 204, respectively. It will further be assumed that the user of user communication component 202 is the user that generates and sends a structured communication and the user of user communication component 204 is the recipient of, and responds to, the structured communication. It will also, of course, be appreciated that many additional users with user communication components can be provided in system 200, but only two users are shown, for the sake of simplicity.

Figure 3:
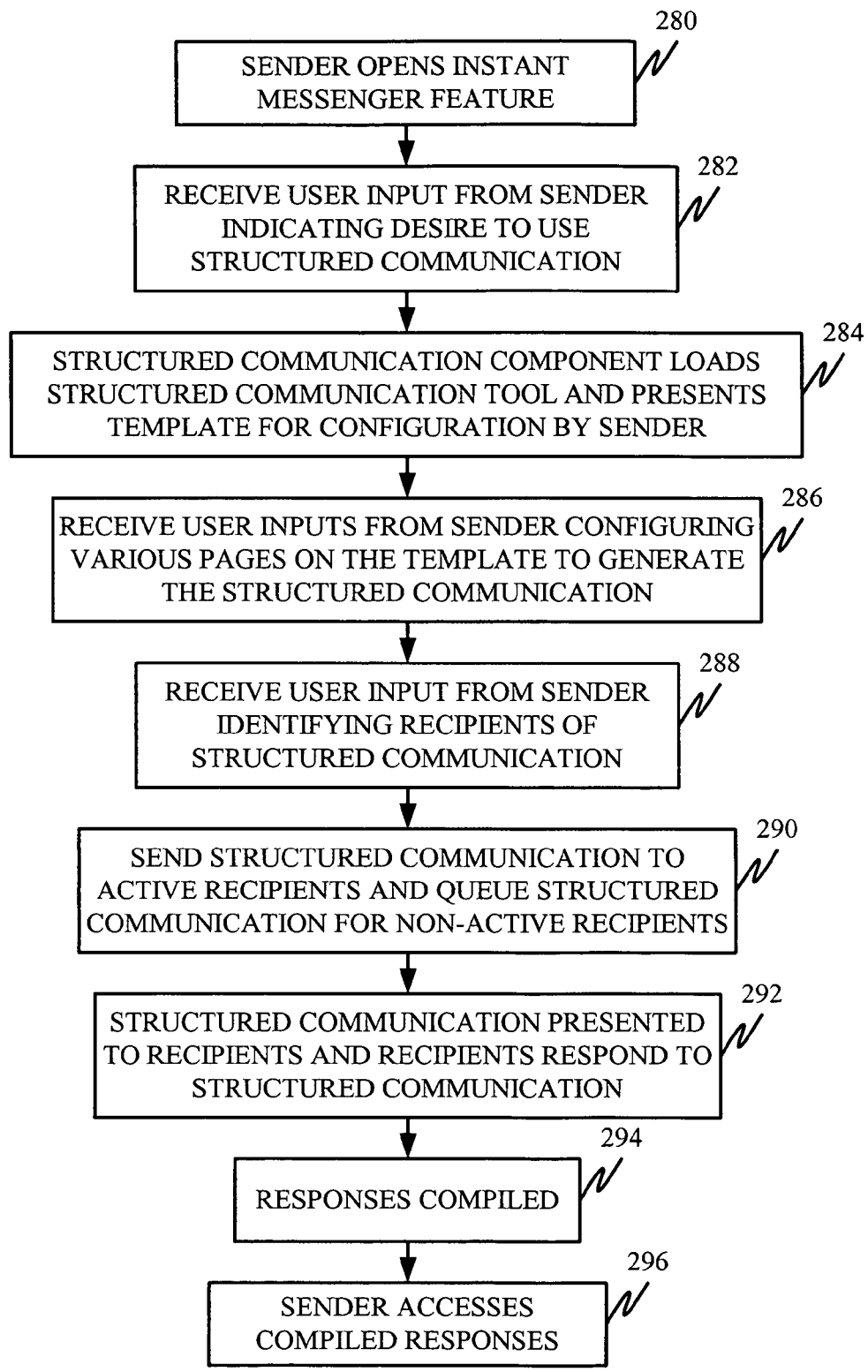
FIG. 3 is a flow diagram illustrating the operation of the system shown in FIG. 2 in accordance with one embodiment of the present invention.

The operation of system 200 is discussed in more detail with respect to FIG. 3. A brief overview will first be given, however. The user of component 202 can quickly and easily generate a structured communication through instant messenger component 212 and structured communication component 216. In one embodiment, the structured communication can be integrated within the instant message generated by the user of component 202, using instant messenger component 212 and structured communication component 216. In that instance, where the structured communication is integrated into the instant message, the message is simply transmitted to communication component 204. Structured communication component 218 on communication component 204 will recognize that a structured communication has been embedded in the instant message and provide functionality to allow instant messenger component 214 to display that structured communication to the user of component 204, and to allow the user to respond to that structured communication.

Once the user has responded to the structured communication, structured communication component 218 then embeds the response to the structured communication in a responsive instant message which is transmitted back to component 202. Structured communication component 216 on component 202 then receives and formats the responses into a desired format such as one of a variety of report forms, tables, etc. In another embodiment, the structured communication generated by the sender can be stored by structure communication service provider 208 and the user can send to a recipient a link to the stored structured communication.

In the embodiment where the user has received a link to a stored structured communication, the recipient can actuate that link. This will cause instant messenger component 214 to illustratively launch a browser and open the web page corresponding to that link and to thus display the structured communication to the recipient for response by the recipient. The web page will display the structured communication and allow the user to select appropriate responses. The responses are then received by structured communication service provider 208 where they are formatted into a pre-selected response format, such as one of a variety of different reports, tables, etc.

In either case, (where the responses are stored on service provider 208 or at the client component 202) the sender can view the results of the responses to the structured communication, whenever desired.

The operation of system 200 will now be described in greater detail with respect to FIG. 3. FIG. 3 is a flow diagram that will be discussed in conjunction with the screenshots shown in FIGS. 4-10 to better illustrate one embodiment of the operation of the system shown in FIG. 2. For the sake of the present discussion, it will be assumed that a sender using component 202 is sending a structured communication to a group of recipients in order to find out where the recipients would like to meet for an upcoming meeting. In the present example, the sender is the leader of a group of employees.

First, the sender opens the instant messaging feature on user communication component 202. For instance, the user may click on the instant messenger icon on his or her laptop computer. This is indicated by block 280 in FIG. 3. This causes instant messenger component 212 to display a user interface to the user, such as that shown in FIG. 4.

Figure 4:
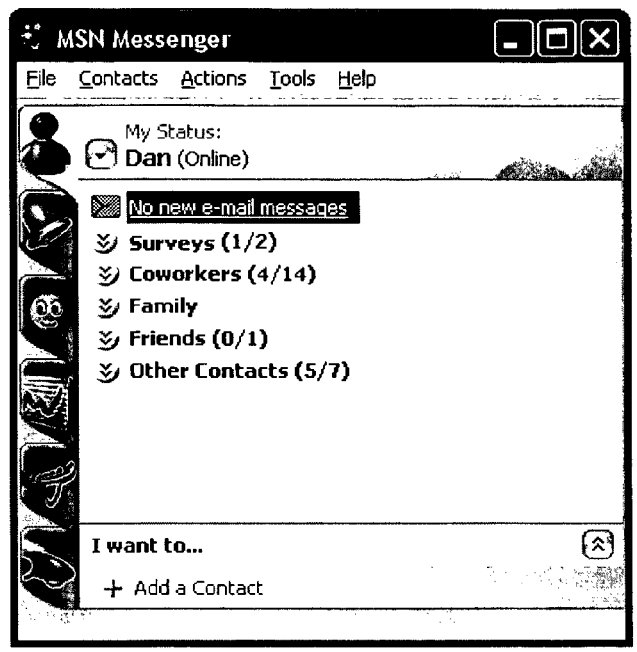
FIGS. 4-10 are screenshots illustrating the steps described in FIG. 3, in accordance with one embodiment of the present invention.

It can be seen that the user interface shown in FIG. 4 opens an instant messenger interface that includes a variety of selectable functions or options, such as "surveys", "co-workers", "family", "friends", "other contacts", etc. For the sake of the present example, it is assumed that the sender wishes to generate a survey that will allow recipients to select one of a variety of different locations for the meeting. Therefore, the user selects the "surveys" option on the user interface shown on FIG. 4, such as by clicking the double down arrow or the display adjacent "surveys". This indicates to instant messenger component 212 that the user desires to send a structured communication to one or more recipients. This is indicated by block 282 in FIG. 3.

Figure 5:

In response to the user input indicating that the user wishes to generate a structured communication (in this case, a survey), instant messenger component 212 expands the survey option as shown in FIG. 5. The example shown in FIG. 5 illustrates that the expanded surveys option allows the user to select one of a variety of sub-options, including "new survey." In the present example, it will be assumed that the sender wishes to create a new survey to determine the desired location for today's meeting. Of course, it will be appreciated that prior surveys can be saved and can be selected and re-sent or re-used at a later time. However, for the present discussion, assume that the user has selected the "new survey" option on the screen shot shown in FIG. 5.

In response, in one illustrative embodiment, structured communication component 216 loads a survey tool that can be used by the sender to generate the survey. In one embodiment, the tool displays a survey template or form that can be modified by the sender to generate the desired survey. The template may be one or more pages that can be configured by the user to fully define the structured communication desired by the user. One embodiment of a template generated by such a survey tool is shown in the screen shot illustrated by FIG. 6.

Figure 6:
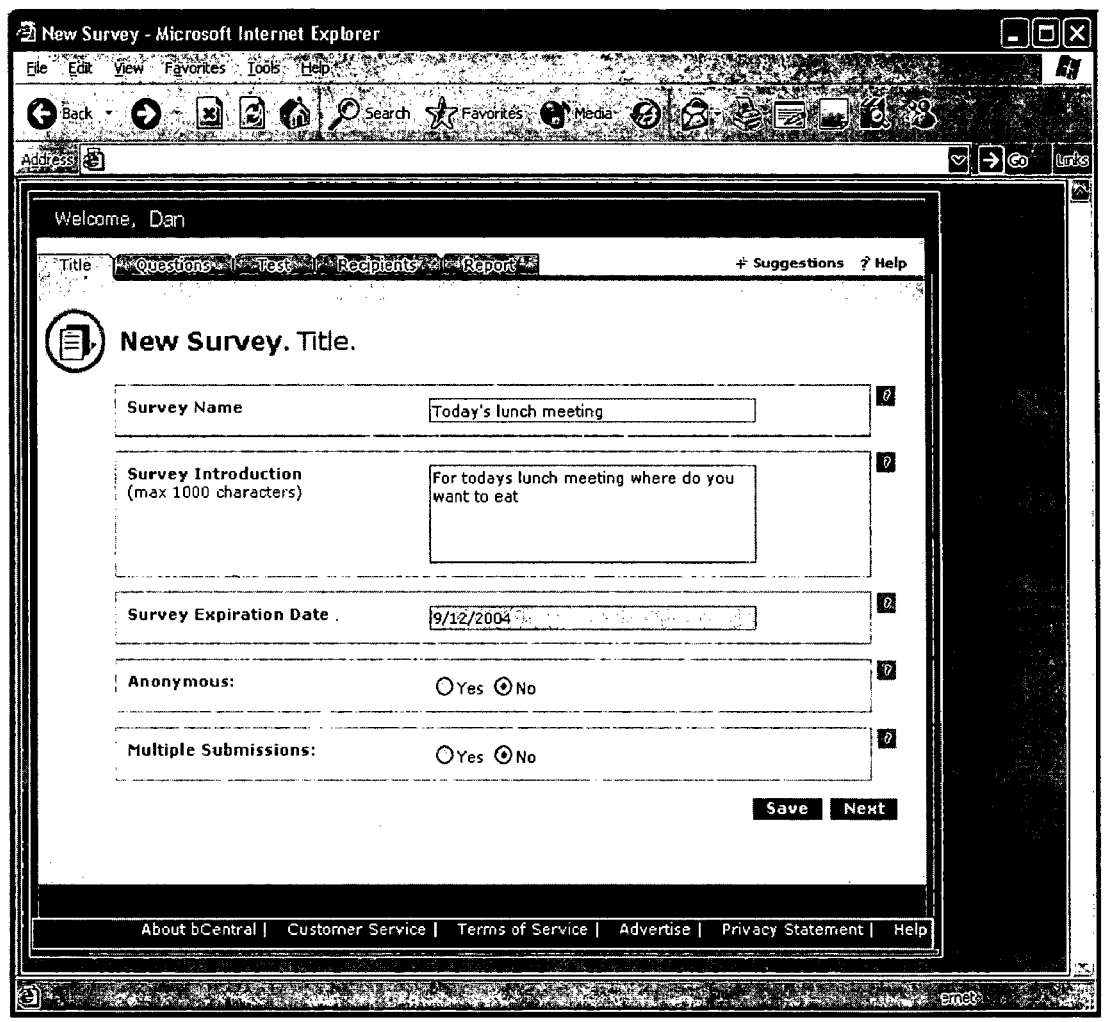

In the embodiment illustrated in FIG. 6, the template includes multiple pages that are categorized by the subject matter of those pages. The subject matter is identified by the tabs along the top of the display shown in FIG. 6. For instance, the template can have one or more pages corresponding to the title of the survey. This allows the sender to make a variety of entries defining the title for the survey. The template may also have one or more pages corresponding to questions in the survey. These pages will allow the sender to configure the structured communications to contain the desired questions. The template may have one or more test pages which allow the sender to test the structured communication after it has been generated. The template may also have one or more recipients pages which allow the sender to identify recipients of the structured communication. In addition, the template may have one or more report pages which allows the sender to review the results of the survey in one of a variety of different report formats or other forms.

FIG. 6 shows that the sender has selected the title portion of the template. This illustrates that the sender can set up a title page with a survey name, a brief textual introduction explaining the survey, a survey expiration date, and indication as to whether the responses to the survey will be anonymous, and an indication as to whether a single recipient can transmit multiple responses to the survey. Of course, these options on the title page shown in FIG. 6 are exemplary only and other or different options can be provided as well.

Once the user has configured the title page as desired. The user can activate the next tab shown in FIG. 6 to move on to a next page or series of pages of the template to be configured, or the user can select a different tab for further configuration of the structured communication. In the embodiment illustrated herein, once the user has configured the title page shown in FIG. 6, the user selects the questions tab and a second page in the structured communications template is displayed to the user such that the user can generate questions to be presented in the structured communication.

Figure 7:
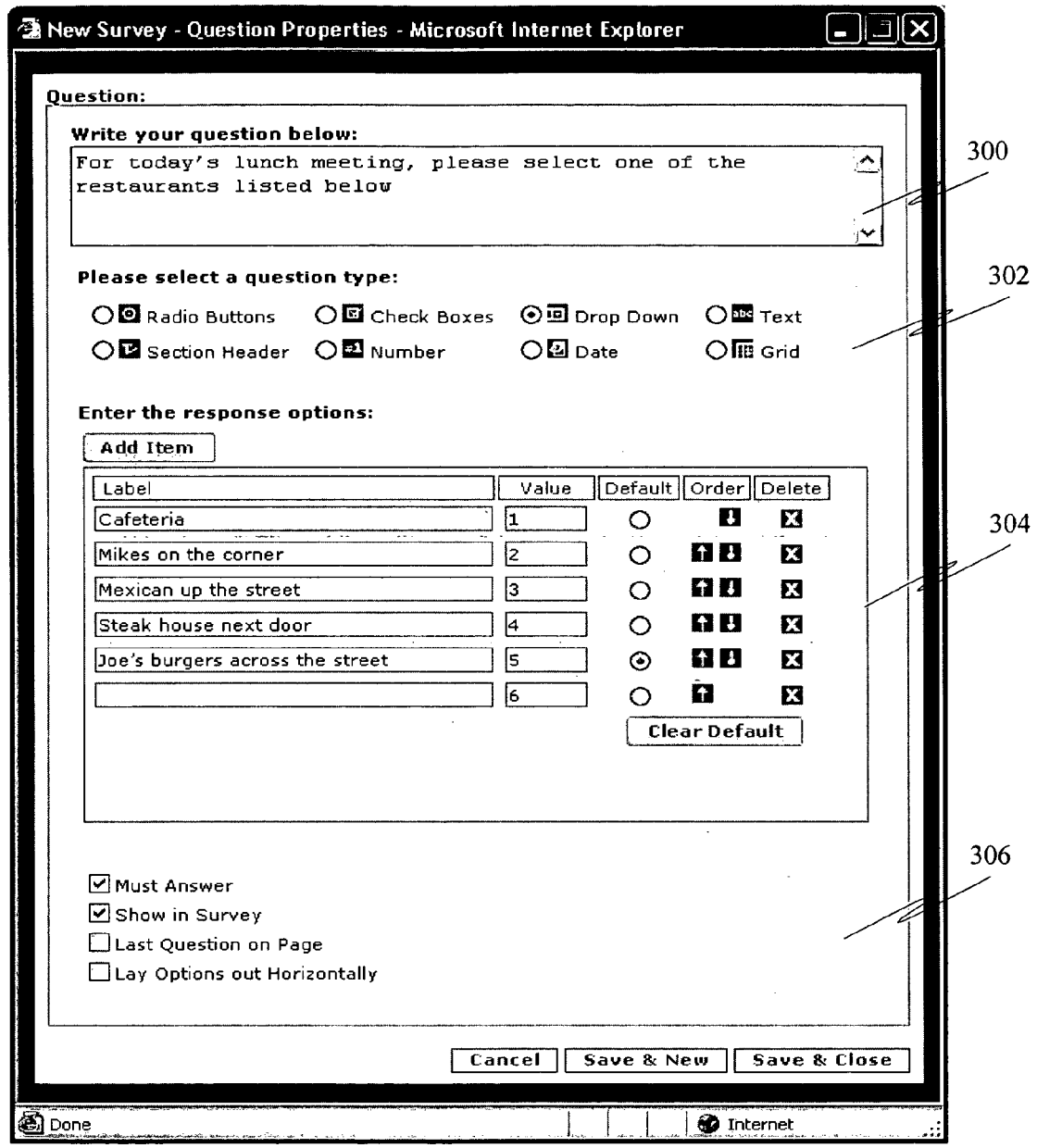

One embodiment of the page that allows the sender to generate questions is illustrated in FIG. 7. It can be seen that the screenshot in FIG. 7 includes a text box 300 that allows the sender to enter in a textual question or comment. The screenshot shown in FIG. 7 also allows the sender to select a question type in block 302. In the example shown in FIG. 7, the user can select whether the questions are to be answered with radio buttons, check boxes, a drop down menu, text, a section header, a number, a date, a grid check off, etc.

The screenshot shown in FIG. 7 also includes a response options section 204 that allows the sender to identify the various options for response to the structured communication. In the example shown, the sender has configured the survey to include, as responses to the question "For today's lunch meeting, please select one of the restaurants listed below." the following response options: "cafeteria", "Mike's on the corner", "Mexican up the street", "steak house up the street" and "Joe's burgers across the street". Box 304 also allows the sender to select a default option which will be provided when the survey expires, if the recipient has not selected another value to respond to the question.

Finally, in the example being discussed, the screenshot of FIG. 7 includes configuration box 306 which allows the sender to indicate whether the recipient must answer the question or can skip the question, whether this question will be shown in the survey, whether this question is to be the last question on a given page, and how the questions and possible responses are to be laid out on the page. While FIG. 7 illustrates one embodiment in which questions can be generated for the structured communication, it will be appreciated that other or different mechanisms can be used to generate questions and the one shown in FIG. 7 is provided by way of example only.

Having completed the title page shown in FIG. 6 and the questions page shown in FIG. 7, the sender in the present example will have substantially completed configuring the template to identify the information requested by the survey. Presenting the template for configuration by the sender, and receiving the various inputs from the sender to configure the pages in the template for the structured communication is indicated by blocks 284 and 286 in the flow diagram shown in FIG. 3.

Once the structured communication has been generated as described above, in one illustrative embodiment, the sender can select the recipients tab to identify who will receive the structured communication. This can be done using a check box, a drop down menu, a text field, or any other desired way of identifying recipients for the structured communication. In the embodiment described herein, a page such as that shown in FIG. 8 is displayed for the user such that the user can select the recipients of the survey.

Figure 8:
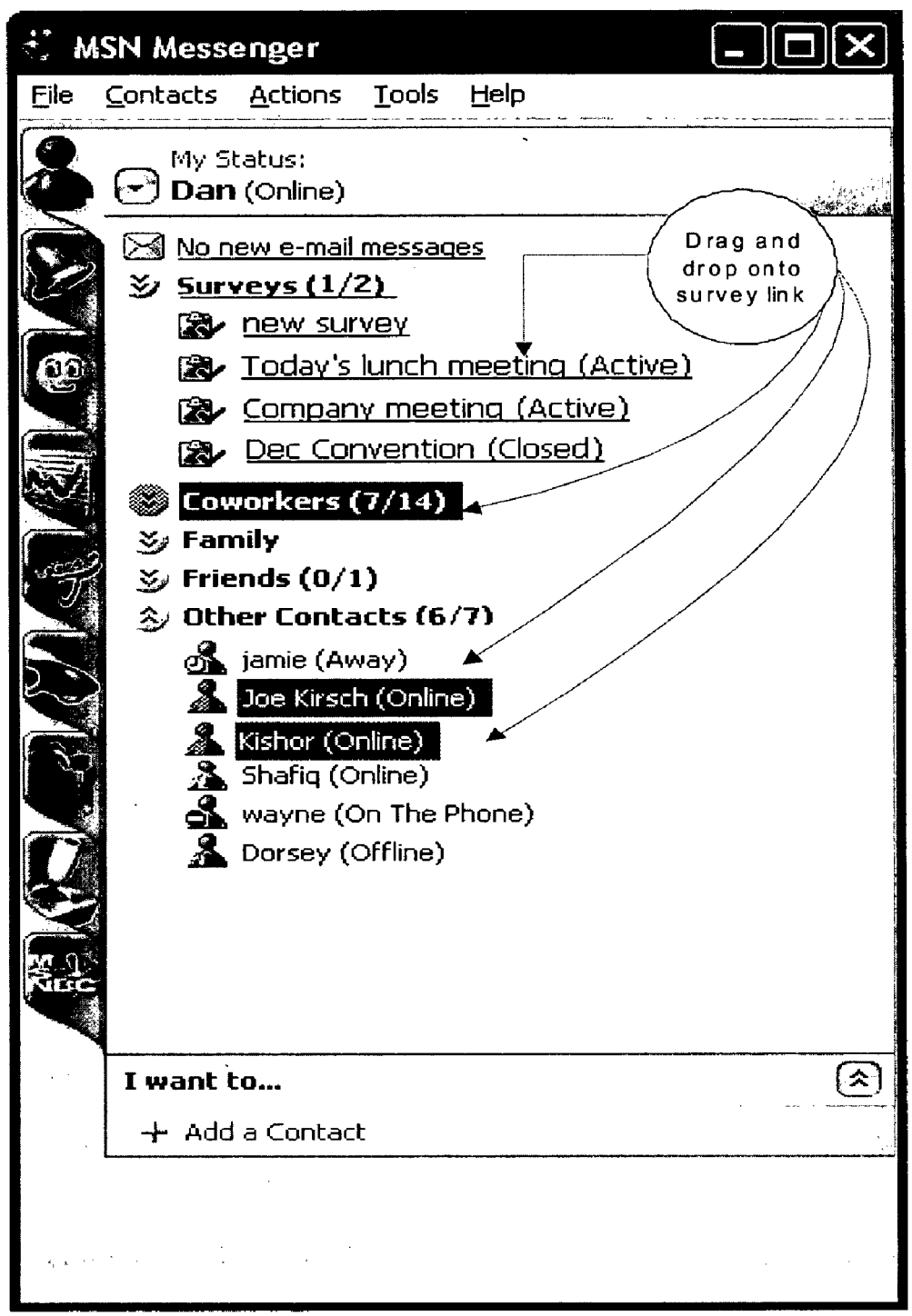

It can be seen that the display shown in FIG. 8 now includes a survey entitled "Today's lunch meeting" under the "survey" option. The user can simply expand any of the contacts options (such as "co-workers", "family", "friends", "other contacts") and select any of those contacts to receive the survey by dragging the contact up to the survey line and dropping it on the survey line. For instance, if the user wishes that "Joe" receive the survey, the user simply clicks on Joe and drags Joe to the "Today's lunch meeting survey" and drops Joe on that survey line. This causes the structured communication component 216 or instant messenger component 212 to identify Joe as a recipient of that structured communication. Of course, the user can drag groups or individuals onto any given survey and the structured communication will be configured to be sent to those groups or individuals. Receiving a user input from the sender identifying the recipients of the structured communication is indicated by block in the flow diagram of FIG. 3.

Once the sender has identified recipients of the structured communication, instant messenger component 212 begins conversations with all on-line recipients and sends the structured communication to those recipients. The instant message containing the structured communication is queued for all recipients that are currently not active. As soon as those recipients activate their instant messenger components, then the structured communication is transmitted to them as well.

Figure 9:
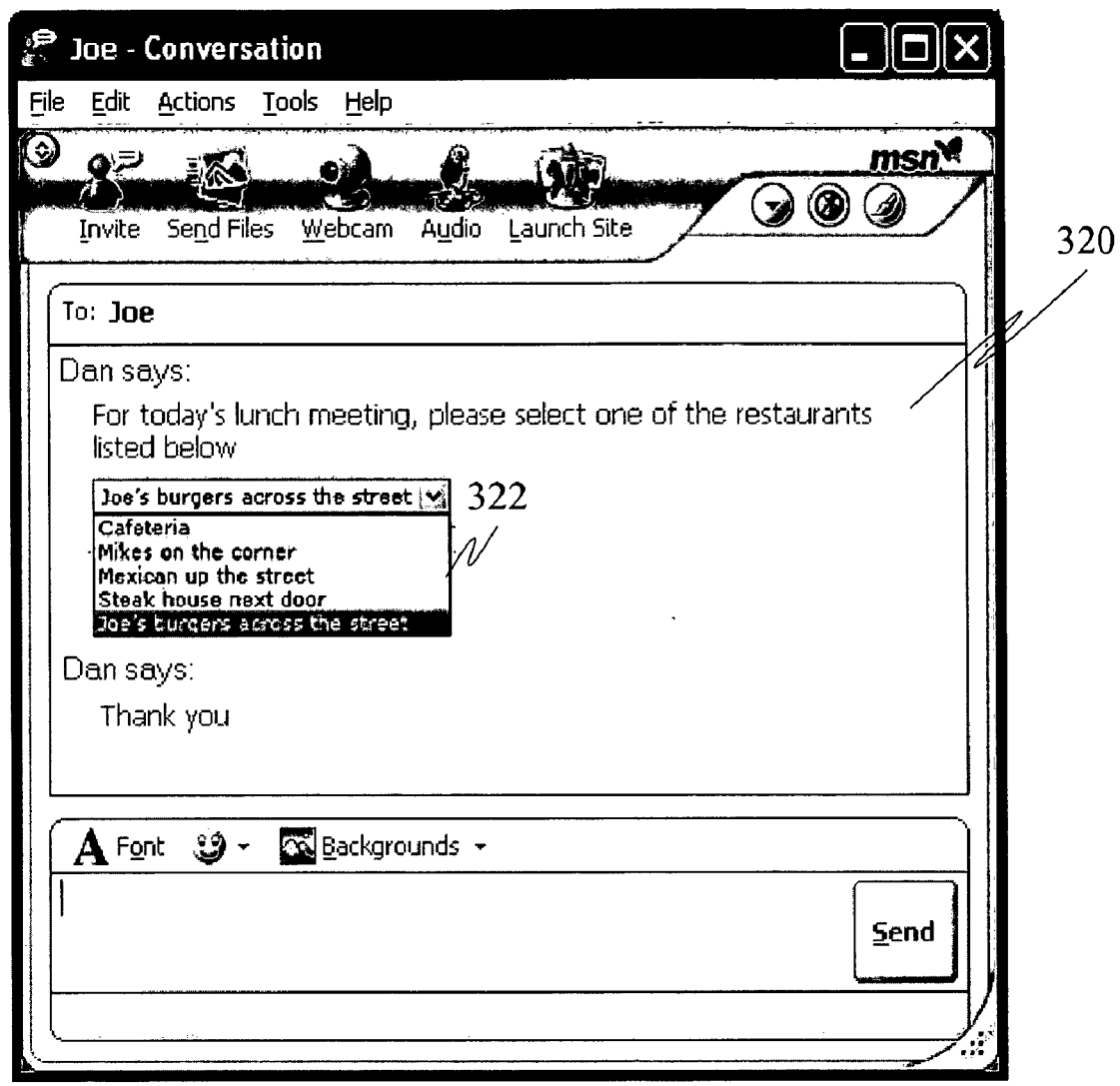

FIG. 9 shows an embodiment in which the structured communication is integrated with an instant message. The screenshot in FIG. 9 shows that the sender's instant messenger component 212 has started a chat conversation with one of the recipient's instant messenger components 214. However, instead of freeform text being displayed to the recipient, a structured question is presented at 320 along with a list of pre-defined selectable options for response in a drop down box indicated at 322. The user can then simply select one of the options in dropdown box 322 and close the instant messaging conversation. In that case, the structured communication has quickly been generated, transmitted and responded to all without an undue amount of time on the part of either the sender or the recipient. Sending the structured communication to active recipients and queuing it for non-active recipients is indicated by block 290 in FIG. 3 and presenting the structured communication to the recipients and receiving responses from the recipients is indicated by block 292 in FIG. 3.

It should be noted that as part of the instant messaging functionality, the sender can illustratively select how long the structured communication will remain active, and accessible for response by the recipients. In other words, the author of the structured communication can set an expiration time for the structured communication. It will also be appreciated that other features can be provided as well. For instance, the author may provide opt-out questions for longer structured communications. These types of questions allow recipients to only respond to part of the structured communication, saving the remaining part of the structured communication for response later, or to opt-out entirely from responding to the structured communication.

As the responses are received, they are compiled by structured communication component 216. In the embodiment in which the structured communication is integrated within an instant message, then structured communication component 216 illustratively receives and processes the responses to the instant message, through instant messenger component 212. Compiling the responses is indicated by block 294 in FIG. 3.

Figure 10:
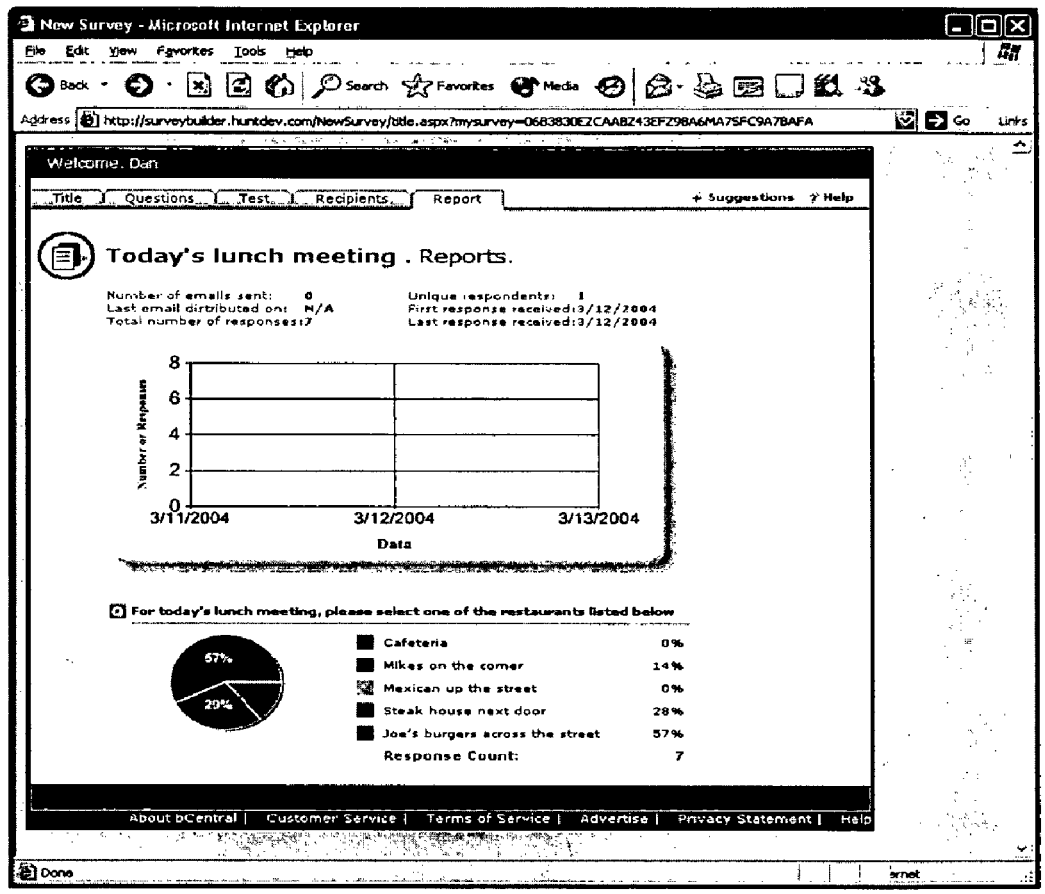

At any time, after the structured communication is sent to the recipients, the sender can check on the results, such as by clicking the "report" tab on the screenshot shown in FIG. 6. In that case, the structured communication component 216 displays to the user a compiled set of results, such as on the screenshot shown in FIG. 10. The screenshot shown in FIG. 10 shows a report illustrating the number of responses on different days, as well as a pie chart and a tabular chart indicating the percentage of the responses that selected each of the various alternatives in the structured communication. For instance, the results shown in the screenshot of FIG. 10 illustrate that 57 percent of the recipients picked "Joe's burgers across the street" in response to the structured communication. Therefore, the sender can now reserve a table for all of the team members and move on to other tasks. Of course, a wide variety of other or additional reports can be generated as well, as desired by the user.

The above discussion has proceeded with respect to an embodiment of the invention in which all structured communication generation, and processing is performed by components 216 and 218 on client components 202 and 204. It will be noted however that much of that functionality can be performed by optional service provider 208 instead. For instance, when a structured communication is to be generated, the template can be loaded from service provider 208 and the customized structured communication can be stored there as well. In that case, to communicate the structured communication to a recipient, the instant message sent by the sender includes a link to the page or pages containing the structured communication at provider 208.

For instance, where the structured communication is a survey stored by service provider 208, the instant messenger component 212 simply sends a link to that survey to the recipient's communication component 204. In that case, the recipient will be presented with a user interface indicating that the recipient has a survey to respond to and asking whether the recipient wishes to respond at this time. If the recipient selects yes, then the structured communication is loaded onto the instant messenger component 214 at the recipient's device 204 for response by the recipient. In the embodiment in which the recipient accesses one or more web pages at structured communication service provider 208 in order to respond to the structured communication, then service provider 208 illustratively receives and compiles the responses.

While the present invention has been described with respect to obtaining an answer for a specific question from a group of people, it can be used in a wide variety of other contexts as well. The structured communication, along with instant messaging described herein, can be used to increase productivity in a variety of areas. For instance, feedback on substantially any topic can be sought from a group, in a structured way, in a very quick and efficient manner using the present invention.

In addition, the present invention is useful in project management. For instance, where a large group of people are all corresponding with one another regarding the direction of a project, the correspondence may quickly become unstructured in that many individuals may be trying to drive a project in different directions. In that instance, a group leader or manager can quickly obtain a consensus from the group, by generating a structured communication offering the various directions of the project as possible responses, and having the group respond in a structured way to arrive at a consensus. The group can then move on to considering other issues with respect to the project.

The present invention can also be used in training. For instance, it is quite common that training programs require trainees to read certain documents and then to take tests on those documents. The present system can quickly be used to determine whether the trainees have read documents, and it can also be used to administer tests. The structured communication can simply ask whether the trainees have read the assigned documents, and can then present the test questions in response to an affirmative answer.

The present invention can also be used to manage vendors and to drive convergence in any group collaboration effort. The present invention may be extremely beneficial in contexts where groups are collaborating to solve a problem in physically disparate locations that reside in different time zones. Instead of sifting through long threads of messages or electronic mail transmissions, or instead of leaving (and listening to) a great number of voice mail messages, a user of the present invention can simply send one structured communication to all those in the group collaboration, regardless of time zone, and wait for the recipients to respond to the structured communication.

In addition, the present invention can be used simply where instant messaging is employed to gain input in a conversational context. For instance, assume that four user's start an instant messaging conversation. The conference soon deteriorates to noise since everyone contributes to the conversation, based on what is on their mind at the present time, which may not be the best use of the groups time. The conference leader can simply send out a structured communication to the group that highlights all of the most pressing issues to be decided by the group along with structured responses. Of course, as described above, this information is structured but can be modified in substantially real time. Therefore, from the responses gathered, the leader can drive the instant messaging conversation to closure, capture results, share those results almost instantaneously, and ensure that everyone in the conversation is of a common understanding. Similarly, in case of a dispute, control of the conversation can be handed over to a dissenting member of the conversation to obtain their input in a structured manner.

It will also be noted that the present structured information can be imported seamlessly into a desktop application, such as a personal information manager, an email program, spreadsheets, etc. Therefore, a subscriber to the present service can configure customized structured communication queries that are context sensitive and are seamlessly integrated with desktop applications of their choosing.

The present invention thus enables instant messaging systems to truly be used as a collaborative work tool that enhances work place productivity. This is in direct contrast to conventional instant messaging systems which provide a continuous stream of text messages that must be manually consolidated to form group consensus.

Although the present invention has been described with reference to particular embodiments, workers skilled in the art will recognize that changes may be made in form and detail without departing from the spirit and scope of the invention.

What is claimed is:

1. A system, comprising:
   an instant messaging system configured to send and receive instant messages,
   the instant messaging system comprising:
   an instant messenger component configured to send and receive incoming instant message communication;
   a survey generation component coupled to the instant messenger component and configured to open a survey construction component in a web browser to allow a user to construct a survey as a web page in the web browser based on user selections within the survey construction component, the survey generation component adapted to place a link to the survey in an outgoing instant message to multiple recipients when the survey is finalized within the web browser, wherein a survey comprises a communication that allows the multiple recipients to each choose one of a plurality of pre-defined responses to specific questions;
   the survey construction component further configured to automatically generate the web page based on the user selections and to store the web page on a server accessible to the multiple recipients;
   wherein the link is configured such that when one of the multiple recipients selects the link, a web page browser will launch and open the web page containing the survey; and
   the survey generation component is further configured to provide an identifier of the outgoing instant message along with a list of potential recipients and to allow a user to select a recipient to receive the outgoing instant message by dragging and dropping a recipient identifier from the list of potential recipients to the outgoing instant message identifier.

2. The system of claim 1 further comprising:
   the server configured to display the outgoing structured communication via the web page when the link is actuated by one of the multiple recipients.

3. The system of claim 1 wherein the survey construction component is configured to generate the outgoing structured communication by providing a template for configuration by the user via the graphical user interface.

4. The system of claim 3 wherein the template comprises a title portion configured to receive a user input indicative of title information corresponding to the structured communication.

5. The system of claim 3 wherein the template comprises a question portion configured to receive a user input indicative of a question to be posed by the structured communication.

6. The system of claim 3 wherein the template comprises a recipient portion configured to receive a user input indicative of multiple recipients of the structured communication.

7. The system of claim 1 further comprising a survey reporting component coupled to the instant messenger component and configured to provide a report for display to the user, the report including a count of each of the pre-defined responses that have been selected by the multiple recipients.

8. A messaging device, comprising:
   an instant messaging component configured to provide a user interface displaying instant messaging features and an actuable survey creation feature, the survey creation feature, when actuated, causing a survey creation user interface to be opened within a web browser and displayed for configuration by a user to generate a survey for in an outgoing instant message to be sent to multiple recipients, wherein a survey comprises a communication that allows the multiple recipients to each select one of a plurality of pre-defined responses to one or more questions; and the survey creation feature configured to automatically generate a web page configured to display the survey to allow the multiple recipients to select one of the pre-defined responses and provide each selection to a survey reporting component, store the web page on a server accessible to the multiple recipients, and place a link to the web page in the outgoing instant message, the link configured such that when one of the multiple recipients selects the link, a web page browser will launch and open the web page having the outgoing structured communication.

9. The messaging device of claim 8 wherein the survey creation user interface comprises a questions portion configurable by the user to indicate multiple questions posed by the structured communication and a responses portion configurable by the user to identify allowed responses to the multiple questions.

10. The messaging device of claim 8 wherein the survey reporting component is configured to provide a report for display to the user, the report including a count of each of the pre-defined responses that have been selected by the multiple recipients.

11. The messaging device of claim 8 wherein the instant messaging component is configured to generate a receipt user interface indicative of receipt of the survey in an instant message.

12. The messaging device of claim 11 wherein the receipt user interface comprises the instant message including the link to the survey configured for response by the recipient and embedded into the instant message.

13. The system of claim 1 wherein the instant messenger component is configured to receive, in an incoming instant message, a link to a survey with pre-defined response features and provide the survey for response by a user.

14. The system of claim 3 wherein the template comprises a recipients portion configured to receive a user input indicative of multiple recipients of the survey.

15. The system of claim 1 wherein the survey construction component is configured to store surveys for re-use.

16. The system of claim 1 wherein the survey construction component is configured to receive responses to the outgoing structured communication.

17. The system of claim 16 wherein the survey construction component is configured to display a report including a count of each of the pre-defined responses that have been selected by the multiple recipients.

18. The system of claim 1 wherein the plurality of pre-defined responses includes more than two pre-defined responses.

19. The system of claim 1 wherein the survey includes one selectable item for each of the pre-defined responses and includes a text box to allow comments to be entered by a respondent of the structured communication.

20. The system of claim 1 wherein the survey comprises multiple questions, wherein each of the multiple questions includes a plurality of pre-defined responses.

21. The system of claim 1 wherein the survey includes an expiration time that determines how long the structured communication will remain active to allow a response.

22. The system of claim 3 wherein the template comprises a selectable option to indicate whether the multiple recipients are each required to respond to the structured communication.

23. The messaging device of claim 9 wherein at least one of the multiple questions can be designated as an opt-out question that allows a recipient to only respond to some of the multiple questions of the structured communication.

24. The system of claim 3 wherein the template comprises one or more test pages to test the survey before it is sent to the multiple recipients.

25. A method for generating an instant message having a structured communication, the method comprising:
launching an instant messenger graphical user interface;
receiving a user input selection from the instant messenger graphical user interface to construct a survey to allow multiple recipients to each choose one of a plurality of pre-defined responses to at least one question;
opening a survey construction component in a web browser in response to the user input selection;
generating the survey and constructing the survey as a web page based on user selections within the survey construction component, the web page configured to display the survey to allow the multiple recipients to select one of the pre-defined responses;
storing the web page on a server accessible to the multiple recipients;
closing the web browser and returning to the instant messenger graphical user interface when the survey is constructed and stored; and
placing a link to the web page in a first instant message within the instant messenger graphical user interface, the link configured such that when one of the multiple recipients selects the link, a web browser will launch and open the survey.

26. The method of claim 25 further comprising selecting the multiple recipients by providing an identifier of the first instant message along with a list of potential recipients and allowing a user to select a recipient to receive the first instant message by dragging and dropping a recipient identifier from the list of potential recipients to the first instant message identifier.

27. The method of claim 26 further comprising:
sending the first instant message having the link to the multiple recipients; and
generating a report based on an indication of selections made on the web page, the report including a count of each of the pre-defined responses that have been selected by the multiple recipients.

28. The method of claim 25 further comprising selecting the multiple recipients by providing an identifier of the first instant message along with a list of potential recipients including at least one identifier of a group of recipients and allowing a user to select the group of recipients to receive the first instant message by dragging and dropping the group identifier from the list of potential recipients to the first instant message identifier.

29. The method of claim 25 wherein the survey construction component comprises a questions portion configurable by the user to indicate multiple questions posed by the survey and a responses portion configurable by the user to identify allowed responses to the multiple questions.

30. The method of claim 25 further comprising storing the survey to allow the survey to be used at a later time.

* * * * *